UNITED STATES PATENT OFFICE 2,467,832

COMPOSITION OF MATTER COMPRISING GELATIN AND POLYVINYL UREA OR DERIVATIVES

Giffin D. Jones, Easton, Pa., assignor to General Aniline & Film Corporation, New York, N. Y., a corporation of Delaware No Drawing. Application October 23, 1945, Serial No. 624,092

6 Claims. (Cl. 260—8)

The present invention relates to derivatives of polyvinylisocyanate and more particularly to reaction products of polyvinylisocyanate with nitrogen-containing compounds having at least one hydrogen on the nitrogen atom, as for example, ammonia and amines.

The new reaction products are compatible with gelatin and may be used as substitutes therefor, or in combination therewith to produce new compositions which are highly useful in the photographic arts.

It is among the objects of my invention to produce new reaction products of polyvinylisocyanate.

It is a further object of my invention to produce new compositions comprising gelatin and reaction products of polyvinylisocyanate with nitrogen compounds having at least one hydrogen on the nitrogen.

According to my invention, the new reaction products are in general prepared by reacting polyvinylisocyanate with a nitrogen compound having at least one hydrogen on the nitrogen, as for example, ammonia and amines. Any amine having at least one hydrogen on the nitrogen may be utilized to react with the polyvinylisocyanate. There can be employed mono- and disubstituted amines. The amino nitrogen substituents may be alkyl, aryl, aralkyl, cycloparaffin, or an hydroxyalkyl group, or the amino nitrogen may be a member of a ring which may be heterocyclic. As specific examples of suitable amines, there may be mentioned methylamine, ethylamine, propylamine, isopropylamine, butylamine, isobutylamine, dimethylamine, diethylamine, dipropylamine, aniline, diphenylamine, ethanolamine, diethanolamine, propanolamine, cyclohexylamine, N-methyl-N-cyclohexylamine, benzylamine, morpholine and piperidine.

In the reaction involving the use of the amines, the polyvinylisocyanate can be reacted at reflux temperature, and when the reaction is complete the converted polymer can be recovered by precipitation in a diluent in which it is insoluble, as for example, ethyl ether.

In the reaction of the polyvinylisocyanate with ammonia it is preferred to carry out the reaction at room temperature. Upon completion of the reaction, the converted polyvinylisocyanate can be recovered by precipitating in a liquid in which the polymer is insoluble, as for example, methanol.

The following examples will serve to illustrate my invention. The parts given therein are by weight unless otherwise specified.

Example 1

To 100 parts of morpholine were added 25 parts of polyvinylisocyanate and the solution was refluxed for 48 hours. The polymer which formed was precipitated as a hygroscopic tan powder by pouring the dark solution of the polymer into absolute ether. A yield of 24 parts of the converted polymer was obtained. It was water-soluble, had a softening point of about 110° C. and a K value in water of 54. Analysis: Calculated for $(C_7H_{12}O_2N_2)_n$: N, 17.92. Found: 13.30.

Example 2

A mixture of 25 parts of polyvinylisocyanate and 102 parts of ethanolamine was refluxed for 48 hours. There was a slight evolution of heat when the reagents were mixed together. The solution obtained on refluxing was distilled under aspirator pressure and the dark gummy residue reprecipitated by dissolving in 320 parts of absolute alcohol and pouring the resulting solution into 1500 parts of absolute ether. The precipitated product which was recovered tended to become gummy. It was water-soluble, had a K value in water of 51 and was compatible with gelatin. Analysis: Calculated for $(C_5H_{10}O_2N_2)_n$: N, 21.5. Found: N, 20.77.

Example 3

A mixture of 140 parts of polyvinylisocyanate and 200 parts of 28% aqueous ammonia solution were permitted to stand at room temperature for 12 hours. A dark solution formed which was filtered and the filtrate was poured into an excess of methanol. There was isolated by filtration a brown, hygroscopic powder which, on drying in a vacuum desiccator, gave a yield of 38 parts of the converted polymer.

That part of the polyvinylisocyanate which did not dissolve in the concentrated ammonia was treated with an additional 100 parts of ammonia and agitated for another 12 hours. All of the polyvinylisocyanate dissolved in the ammonia and, on pouring the solution into methanol, the converted polyvinylisocyanate precipitated and was filtered. On drying, a yield of 20 parts of the converted polymer was obtained. Both crops of the converted polymer were water-soluble powders which gave slightly viscous solutions and were compatible with gelatin. Analysis: Calculated for $(C_3H_6ON_2)_n$: N, 31.4 Found: N, 24.

The following will serve to illustrate the novel compositions which may be obtained from the new derivatives of polyvinylisocyanate when employed in combination with gelatin.

Example 4

In a solution of 1.4 parts of the polyvinylisocyanate-morpholine reaction product as obtained according to Example 1, and 42 parts of water, there were dissolved 2.6 parts of gelatin. The resulting solution was coated on a base and allowed to dry. A slightly tan clear film which displayed good compatibility with the gelatin was obtained.

Example 5

A solution was prepared from 0.5 part of the polyvinylisocyanate-ethanolamine reaction product obtained according to Example 2, 0.5 part of gelatin and 9 parts of water. Films cast from this solution were clear, thereby indicating a good compatibility of the polyvinylisocyanate reaction product with gelatin.

Example 6

A solution was prepared containing 0.5 part of gelatin, 0.5 part of the polyvinylisocyanate-ammonia reaction product obtained according to Example 3, and 9 parts of water. When the solution was cast, a clear film was obtained.

Instead of the ethanolamine and morpholine of Examples 2 and 3, it is to be understood that the polyvinylisocyanate may be reacted in a similar manner with other amines, such as those mentioned hereinabove. The proportions of the reagents may be varied. Thus, the nitrogen-containing compounds may be employed in from less than to an excess of the base molecular equivalent of the polyvinylisocyanate. Thus, from about 0.75 to about 5 mols of the nitrogen compound may be employed for each base mol of polyvinylisocyanate. However, it is preferred to use the nitrogen compound in excess.

The temperature of the reaction may be varied depending on the volatility of the nitrogen-containing compounds. The reaction may be carried out at room temperature or at temperatures above or below room temperature. Where the nitrogen-containing compounds are volatile, the reaction may be carried out at elevated temperatures under pressure in a sealed reaction vessel. In the case of the amines, reflux temperatures have been found to be satisfactory for carrying out the conversion of the polyvinylisocyanate. In general, the reaction time may vary from approximately 12 hours to 48 hours. With higher temperatures the time of treatment may be shortened, whereas when operating at low temperatures the time required is increased.

The polyvinylisocyanate employed as a starting material may be obtained by introducing acrylyl chloride into a suspension of sodium azide in dimethylformamide, permitting the reaction to proceed at about 90° C. for a length of time sufficient to form a suspension of polyvinylisocyanate in the dimethylformamide, and then precipitating the polymer by diluting this suspension with ether. The polymer is finally recovered by filtration. The process of producing polyvinylisocyanate comprises the subject matter of my copending application, Serial No. 624,093, filed October 23, 1945.

The products obtained by the reaction of polyvinylisocyanate and the nitrogen-containing compounds are believed to be polyvinylureas which correspond to the probable general formula:

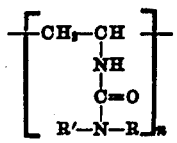

wherein R and R' may be hydrogen, alkyl, aryl, aralkyl, cycloparaffin, or hydroxyalkyl groups; or R and R' taken together with the N may form a ring which may be heterocyclic. Thus, for example, R and R' may be methyl, ethyl, propyl, isopropyl, butyl, isobutyl, phenyl, hydroxypropyl, cyclohexyl, benzyl; or when taken together with the N, morpholine or piperidine. R and R' may be the same or different.

Thus, the reaction products of Examples 1, 2 and 3 may be represented by the following probable formulas:

Example 1

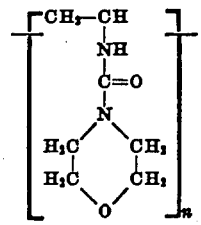

(Polyvinylmorpholineurea)

Example 2

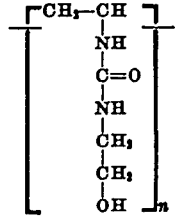

(Polyvinylethanolurea)

Example 3

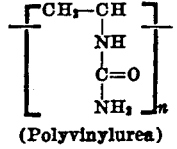

(Polyvinylurea)

When the amines are utilized in the reaction, substituted polyvinylureas are obtained. The substituent on the N atom not directly attached to the vinyl group will depend on the amine employed in the reaction. When ammonia is employed unsubstituted polyvinylurea is obtained.

I claim:

1. A composition of matter comprising gelatin and a polyvinyl urea, produced by reacting polyvinylisocyanate with a nitrogen compound having at least one reactive hydrogen atom attached to the nitrogen, of the class consisting of ammonia, primary and secondary alkyl-, aryl-, aralkyl-, cycloparaffinic- and hydroxyalkyl-amines, and heterocyclic nitrogen bases.

2. A composition as defined in claim 1, comprising substantially equal parts of gelatin and of said polyvinyl urea.

3. A composition as defined in claim 1, wherein the amount of said polyvinyl urea exceeds 50% of the amount of gelatin.

4. A composition of matter comprising gelatin and polyvinylmorpholineurea.

5. A composition of matter comprising gelatin and polyvinylethanolurea.

6. A composition of matter comprising gelatin and polyvinylurea.

GIFFIN D. JONES.

REFERENCES CITED

The following references are of record in the file of this patent:

UNITED STATES PATENTS

| Number | Name | Date |
|---|---|---|
| 2,006,002 | Schneider | June 25, 1935 |
| 2,191,654 | Haon | Feb. 27, 1940 |
| 2,273,891 | Pollack | Feb. 24, 1942 |
| 2,326,287 | Coffman | Aug. 10, 1943 |
| 2,334,476 | Coffman | Nov. 16, 1943 |

OTHER REFERENCES

Jones et al., Journal of Organic Chemistry, Nov. 1944, pp. 500, 509.